US011136923B2

(12) United States Patent
Aounali et al.

(10) Patent No.: US 11,136,923 B2
(45) Date of Patent: Oct. 5, 2021

(54) DEVICE FOR REGULATING SUPPLY FLOW RATE

(71) Applicant: SAFRAN AIRCRAFT ENGINES, Paris (FR)

(72) Inventors: Abdallah Aounali, Moissy-Cramayel (FR); Petar Tomov, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 80 days.

(21) Appl. No.: 16/715,129

(22) Filed: Dec. 16, 2019

(65) Prior Publication Data
US 2020/0191064 A1   Jun. 18, 2020

(30) Foreign Application Priority Data

Dec. 17, 2018   (FR) ........................................ 1873060

(51) Int. Cl.
F02C 7/236   (2006.01)
F02C 9/28   (2006.01)
(52) U.S. Cl.
CPC ................ F02C 9/28 (2013.01); F02C 7/236 (2013.01); F05D 2210/13 (2013.01)
(58) Field of Classification Search
CPC ............................ F02C 7/236; F05D 2210/13
See application file for complete search history.

(56) References Cited

U.S. PATENT DOCUMENTS

| | | | | |
|---|---|---|---|---|
| 4,025,238 A * | 5/1977 | Masclet | ................ | F04B 23/106 417/203 |
| 4,512,722 A * | 4/1985 | Mouton | .................. | F02C 7/236 417/205 |
| 5,118,258 A * | 6/1992 | Martin | ................... | F02C 7/236 417/3 |
| 5,490,387 A | 2/1996 | Bisson | | |
| 2005/0279079 A1 * | 12/2005 | Baryshnikov | ........... | F02C 7/236 60/39.094 |
| 2012/0167582 A1 * | 7/2012 | Roesler | .................... | F23K 5/14 60/776 |
| 2014/0203824 A1 * | 7/2014 | Nivet | ................... | G01N 27/221 324/663 |

FOREIGN PATENT DOCUMENTS

WO   WO 2018/115653 A1   6/2018

OTHER PUBLICATIONS

Official Communication dated Aug. 27, 2019, in corresponding FR Application No. 1873060 (2 pages).

* cited by examiner

Primary Examiner — Katheryn A Malatek
(74) Attorney, Agent, or Firm — Bookoff McAndrews, PLLC

(57) ABSTRACT

A device for regulating the fuel supply flow rate for a turbine engine, comprising at least a pump, an upstream line leading to the pump, a downstream line downstream of the pump, a recirculation duct branched off the downstream line, allowing to collect the fluid in the downstream line and channel it towards the upstream line, a means for regulating the flow rate disposed on the recirculation duct, a phase measurer disposed in the upstream line, a computing unit connected to the phase measurer and to the flow rate regulating means, said computing unit controlling the flow rate regulating means such as to control the degree of opening of said flow rate regulating means, according to the gas content value in the upstream line.

8 Claims, 2 Drawing Sheets

[Fig. 1]
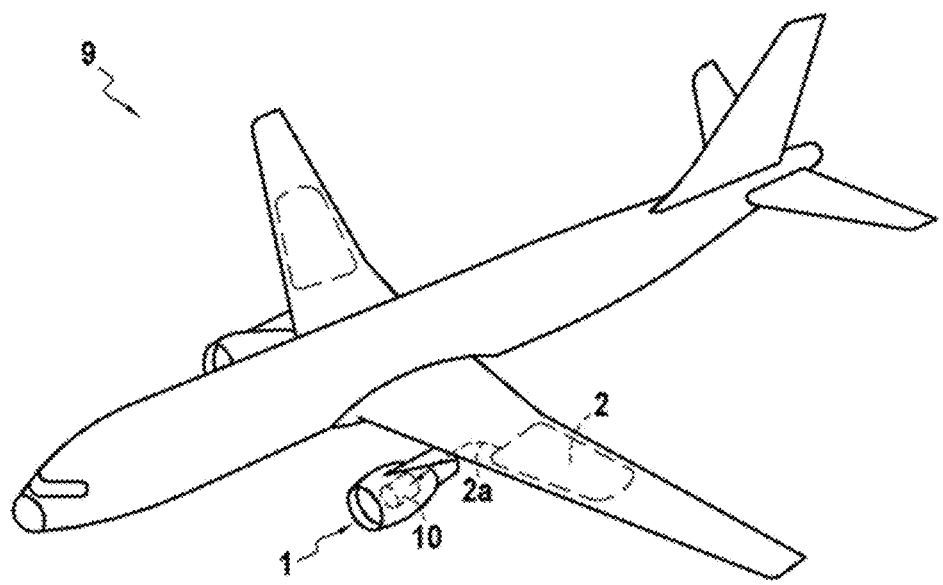
[Fig. 2]
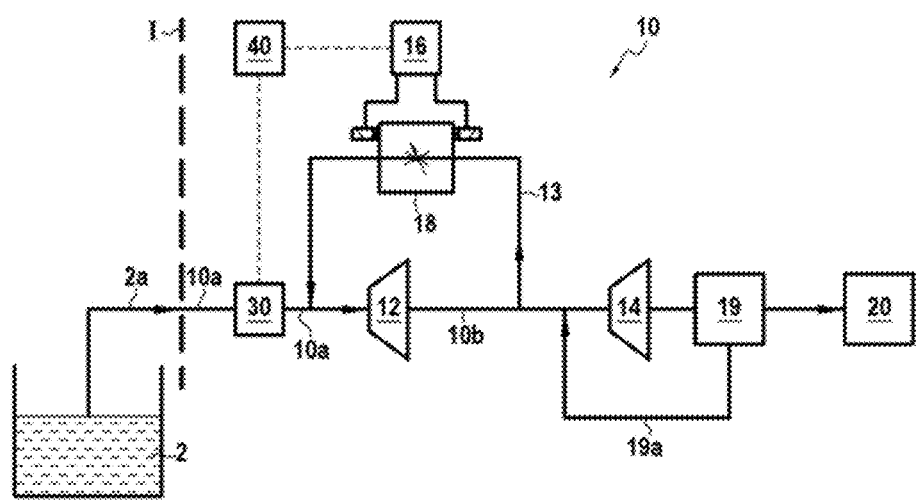

[Fig. 3]
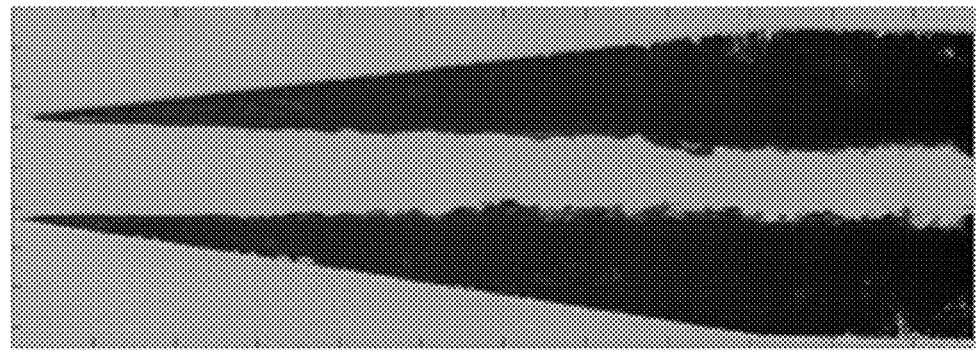
[Fig. 4]
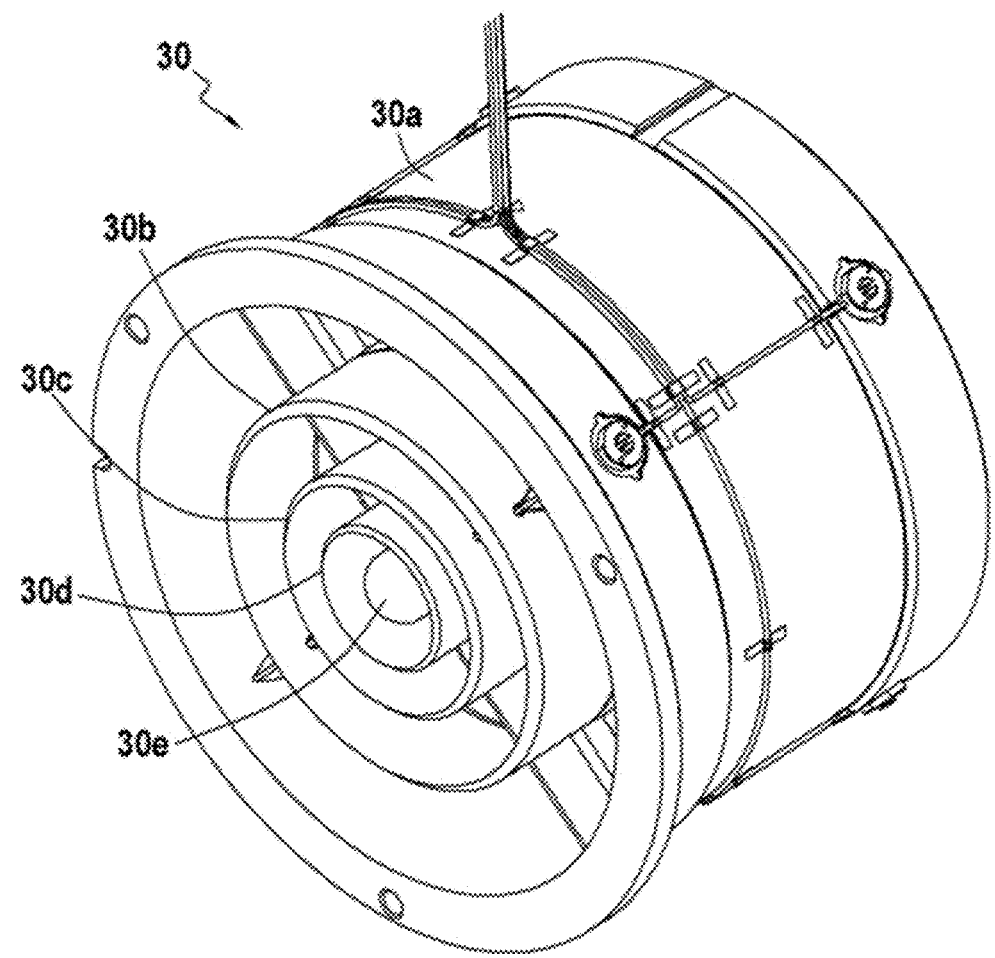

DEVICE FOR REGULATING SUPPLY FLOW RATE

CROSS-REFERENCE TO RELATED APPLICATION(S)

This application claims priority under 35 U.S.C. § 119 to French Patent Application No. 1873060, filed Dec. 17, 2018, the entirety of which is incorporated by reference herein.

TECHNICAL FIELD

The present invention relates to the field of fuel supply circuits for engines and particularly, for turbine engines, and relates more particularly to a device for regulating the fuel supplyflow rate, and a regulating method using such a device, in which a two-phase flow flows.

The present invention can in particular be used for an aircraft turbojet engine.

PRIOR ART

Aircraft engines typically include fuel supply circuits that collect fuel from tanks usually located in the wings of the aircraft. During its passage from these tanks to the engine, the fuel first flows in a duct coming from these tanks and belonging to the aircraft and then in a duct belonging to the engine supply circuit. The joining of these two ducts hence constitutes an interface between the aircraft and the engine. Furthermore, the circuits for supplying these engines include pumping equipment that allows pressurising the fuel prior to its supply to the combustion chamber. This pumping equipment generally includes two levels: a pump BP (low pressure), and a pump HP (high pressure) The pump BP is usually a centrifugal pump with an impeller with blading, the proper operating of which highly depends on its proper fuel supply. Particularly, this type of pump being provided to operate with liquid phase fluids, the presence of gas in the fuel flow risks impairing the proper operating of the pump.

However, during the construction of the engine, engine manufacturers do not necessarily precisely know the operating conditions to which this engine shall be subjected to when in flight, particularly, they do not necessarily know the design details of the tanks and the fuel lines of the aircraft. Conversely, the engine manufacturers do not necessarily know the type of engine that shall be used on a given aircraft, several engine models generally being compatible for one same aircraft model. As a result, an unfamiliarity may stem as regards the flow conditions that exist between the interface between the aircraft and the engine. However, depending on the configuration of the aircraft and its conditions for use (geometry of the lines, altitude, type of fuel, temperature, . . . ), the flow characteristics of this interface can be disrupted. The consequences can in particular be degassing, or even cavitation, as well as the coupling of both phenomena which appear when the pressure of the flow gets too low. The thus, obtained two-phase flows then contain microbubbles, bubbles or entire gas pockets which risk disrupting the operation of the pump BP, or even damaging it, and thereby causing engine dysfunctions.

These flow regimes can be detrimental to the proper operating of the pump, and hereby the engine. In fact, these types of regimes, the pump BP can be punctually supplied by a fluid substantially under gaseous phase. This configuration can in particular lead to the unpriming of the pump, or even give rise to vibrations, as well as the appearance of a pumping phenomenon that can damage the pump.

In order to avoid these types of flow regimes, it is essential to simulate and hence correctly specify the fuel supply conditions at the interface between the aircraft and the engine during the flight. However, as it has been mentioned hereinabove, engine manufacturers rarely have sufficient information, particularly as to the exact aircraft configuration, to make such simulations possible. As a result, the current solutions for avoiding these flow regimes are restricted to limiting the flight envelope so as to avoid any risks of having too low pressure (promoting cavitation phenomenon) at the interface between the aircraft and the engine, or even oversizing the pump BP, thus, as a result, unnecessarily increasing the mass of the propulsion element.

Hence, there exists a need for a device for regulating the fuel supply flow rate and a method for regulating fuel flow rate, allowing limiting the aforementioned drawbacks.

SUMMARY OF THE INVENTION

The present disclosure relates to a device for regulating fuel supply flow rate for a turbine engine, comprising:
at least one pump,
an upstream line leading to the pump,
a downstream line exiting the pump,
a recirculation duct branched off the downstream line, allowing to collect a certain quantity of fluid in the downstream line and channel the fluid collected from the downstream line towards the upstream line,
a means for regulating the flow rate disposed on the recirculation duct,
a phase measurer able to determine the gas content of a two-phase flow disposed in the upstream line,
a computing unit connected to the phase measurer and the flow regulating means, said computing unit being configured to control the flow regulating means such as to control a degree of opening of said flow regulating means, according to the gas content value in the upstream line determined by the phase measurer.

In the present disclosure, the flow can be a flow of liquid, or a two phase flow, that is to say, a flow of a fluid including a liquid phase and a gaseous phase including the liquid and air vapour initially dissolved in the liquid, and the terms "upstream" or "downstream, are comprised according to the flow direction of the fluid in the fuel circuit (going from the fuel tank towards the combustion chamber).

The variation of the degree of the flow rate regulating means corresponds to a variation of the passage section of the fluid in the recirculation duct.

By "gas content", is understood, the total volume proportion of the gaseous phase in all the fluid on a portion of the upstream line.

The value of the gas content in the upstream line detected by the phase measurer, determines the degree of opening of the flow regulating means, in other words, the fluid flow rate circulating in the recirculation duct and reinjected in the upstream line.

This device allows adjusting the flow rate of fluid supplying the pump directly upstream of the latter. Thanks to this device, it is thus possible to avoid flow regimes that can harm the engine operating, by detecting the appearance of such regimes and by simply modifying the flow rate. This is possible without it being necessary, in the case of an aircraft engine, to limit the flight envelope. Furthermore, such a device makes it possible to not have to over-dimension the pump, thereby, avoiding increasing mass and bulk. Furthermore, this flow rate regulating device allows correcting the presence of the gaseous phase over the entire operating range, whatever the gaseous phase content value.

In some embodiments, the flow rate regulating means comprises a first regulating member connected to the computing unit, and a second regulating member disposed on the recirculation duct, the degree of opening of the second regulating member being controlled by the first regulating member.

In some embodiments, when the gas content value in the upstream line increases, the computing unit is configured to control the at least partial closing of the second regulating member, by means of the first regulating member, such as to reduce the circulation flow rate of fuel flowing in the recirculation duct.

In some embodiments, the recirculation duct is connected to the upstream line, downstream of the phase measurer.

The fluid collected in the downstream line and which circulates in the recirculation duct is thus injected in the upstream line downstream of the phase measurer, directly upstream of the pump. By "directly upstream", it is understood that the connecting point between the by-pass duct and the upstream line, and the pump, are connected only by a portion of the upstream line, no other element of the device being disposed on this portion.

In some embodiments, the first regulating member is a servo valve, and the second regulating member is a recirculation valve.

By "servo valve" is understood a hydraulic valve with electrically controlled opening, allowing the automatic control of its opening, more particularly the opening of the recirculation valve (or regulating valve). Furthermore, the variation of the degree of opening of the recirculation valve corresponds to a variation in the passage section of the fluid in the recirculation duct.

In some embodiments, the low pressure pump is a centrifugal pump with an impeller with blading.

The present disclosure also relates to a turbine engine comprising at least a device according to any one of the preceding embodiments.

The present disclosure also relates to a method for regulating the fuel supply flow rate for a turbine engine using the device according to any one of the preceding embodiments, comprising the steps of: determining, in the upstream line, the gas content of a flow supplying the pump by the phase measurer; and regulating the degree of opening of the flow rate regulating means by means of the computing unit according to the gas content in the upstream line, determined at the determining step.

In some embodiments, when the phase measurer detects an increase in the gaseous phase at the determining step, the computing unit controls the at least partial closing of the flow rate regulating means such as to reduce the circulation flow rate of the fuel flowing in the recirculation duct.

BRIEF DESCRIPTION OF THE DRAWINGS

The invention and its advantages shall be better understood upon reading the following detailed description of an embodiment of the invention given in a non limiting manner. This description refers to the accompanying figures, on which:

FIG. 1 represents an aircraft including a supply circuit according to the present disclosure;

FIG. 2 schematically represents such a supply circuit;

FIG. 3 represents, in a modelised manner, a line in which a fluid flows in the presence of a gaseous phase, at the inlet of a pump;

FIG. 4 represents a phase measurer.

DESCRIPTION OF THE EMBODIMENTS

FIG. 1 represents an aircraft 9 including an engine 1 and fuel tank 2 disposed in a wing of the aircraft 9. The engine 1 includes a fuel supply flow rate regulating device, the regulating device being a supply circuit 10 supplied by the fuel collected in the tank 2. During its course from the tank 2 to the engine 1, the fuel first flows in a tank duct 2a originating from the tank 2 and belonging to the aircraft 9, then in a duct 10a belonging to the supply circuit 10 of the engine 1. The junction between these two ducts 2a and 10a constitutes an interface I between the aircraft 9 and the engine 1.

The supply circuit 10 is schematically represented on FIG. 2. It includes a pumping equipment allowing to pressurise the fuel prior to its supply to the combustion chamber 20. This pumping equipment includes a first pump 12 (low pressure pump), and a second pump 14 (high pressure pump). The arrows on FIG. 2 represent the flow direction of the fuel. The duct 10a is an upstream line, in which the fuel coming from the tank 2, and leading to pump 12 circulates. The first pump 12 opens onto a downstream line 10b, in which the fuel circulates up to the second pump 14, to which the downstream line 10b is connected. The fuel exiting from the second pump 14 then supplies a metering valve 19, then the fuel injectors of the engine 1 combustion chamber 20. The part of the fluid collected by the metering valve 19 downstream of the second pump 14, is re-channeled upstream of the second pump 14 by means of a metering duct 19a.

A phase measurer 30 is disposed in the upstream line 10a, downstream of the interface I. As it is represented on FIG. 4, the phase measurer 30 includes a cylindrical envelope 30a, inside which there are a plurality of electrodes 30b, 30c, 30d, 30e that are cylindrical and concentric with each other and with the cylindrical envelope 30a. The fluid flowing into the upstream line 10a flows inside the phase measurer 30, along these electrodes. The electrodes enable to measure an electrical capacity of which the value is representative of the gas content of the fluid flowing in the phase measurer 30.

The supply circuit 10 further includes a recirculation duct 13. The recirculation duct 13 allows collecting a certain quantity of fuel in the downstream line 10b. The recirculation duct 13 is branched off the downstream line 10b, between the first pump 12 and the second pump 14. The recirculation duct 13 is also connected on the upstream line 10a, upstream of the first pump 12 and downstream of the phase measurer 30.

Furthermore, a recirculation valve 18 is disposed on the recirculation duct 13. The opening of the recirculation valve 18 is controlled by a servo valve 16. The servo valve 16 controls the degree of opening of the recirculation valve 18, in other words, the fluid flow rate flowing in the recirculation duct 13, towards the upstream line 10a.

A computing (or calculating) unit 40 is connected to the phase measurer 30 and to the servo valve 16. The control unit 40 can be of FADEC type (Full Authority Digital Engine Control). The gas content of the fluid flowing in the upstream line 10a, measured by the phase measurer 30, is transmitted to the computing unit 40. According to this gas content value, the computing unit 40 sends a signal corresponding to the servo valve 16 which controls the degree of opening of the recirculation valve 18, according to the method described hereinafter.

The first pump 12 is a centrifugal pump with an impeller with blading, with or without an inducer with blading, upstream of said impeller. The operating principle of this centrifugal pump is described herein-below.

On the centrifugal pump, the transmission of energy is achieved hydrodynamically. During the hydrodynamic transmission of the energy, the fluid is accelerated by the disc of the centrifugal pump. The effort transmitted to the fluid and hence the increase in pressure, is calculated based on the velocities on the disc, between the input velocity of the blading and the output velocity of the blading.

The performance of the disc hence highly depends on the velocity triangle in the inlet of the pump. In fact, the input angle of a blading of a centrifugal pump is designed such as to guide the fluid in rotation for a given output range. The presence of the gaseous phase in the inlet of the pump, directly impacts on the velocity triangle in input of the disc, and hence the performance of the pump.

In the presence of the gaseous phase, the effective fuel passage section (illustrated by the grey portion on FIG. 3) is reduced as the section is occupied by the gaseous phase (illustrated by the black portions on either side of the grey portion).

Maintaining the flow rate of the pump in these conditions implies an increase in velocity of the fuel in order to compensate for the section reduction.

The velocity $C_{u1}$ in input of the blading is hence increased as follows: $C'_{u1}=C_{u1}*(1+V/L)$, where V/L represents the ratio of the gaseous fraction to the liquid fraction. If this velocity increase becomes too important, it can cause an incidence that is not adapted to the blading angle in input, highly reducing the performance and resulting in detachment, recirculation and cavitation type phenomena.

The device according to the present disclosure consists in using the phase measurer 30 upstream of the low pressure pump 12 in order to regulate the speed $C_{u1}$ in input of the blading and optimise the performance of the pump, whatever the V/L ratio, and over the entire flow rate operating range. It is also possible to lock the passage of the fluid at the inlet of the low pressure pump 12.

In other words, instead of dimensioning the pump over a given flow rate range Q, the low pressure pump 12 is dimensioned for the same range increased as follows: $Q_{dim}=Q*(1+V/L)$.

In the absence of the vapour phase, that is to say, V/L=0, the recirculation loop ensures the redirection of the surplus flow rate at the inlet of the pump 12.

In presence of the vapour phase, that is to say, V/L>0, the phase measurer 30 transmits the value V/L to the computer 40 that will control the servo valve 16, which in turn controls the recirculation valve 18. The latter hence, reduces the passage section of the recirculation duct 13. The recirculation flow rate flowing in the recirculation duct is hence reduced, along with the velocity $C_{u1}$ (with the ratio V/L). Thus, a velocity $C_{u1}$ is obtained in input of the pump that is always coherent with the angle of attack of the inlet blading of the low pressure pump.

When the phase measurer 30 detects a given value V/L, the operating point is thus, slightly offset. In order to do this, the opening of the recirculation valve is reduced in order to diminish the fuel flow rate and leave the critical point.

Although the present invention has been described with reference to specific embodiment examples, it is obvious that modifications and changes can be made on these examples without departing from the general scope of the invention such as defined by the claims. Particularly, individual characteristics of the different embodiments illustrated/mentioned can be combined in additional embodiments. As a result, the description and the drawings should be considered in an illustrative sense rather than a restrictive one.

It is also obvious that the low pressure level of the pump 12 can include a volute. The action of the pump when V/L>0 is, in no case influenced by the presence of said volute.

It is also obvious that all the characteristics described with reference to a method are transposable, alone or in combination, with a device, and conversely, all the characteristics described with reference to a device are transposable, alone or in combination, with a method.

What is claimed is:

1. A device for regulating a fuel supply flow rate for a turbine engine, comprising:
   at least one pump,
   an upstream line leading to the at least one pump,
   a downstream line exiting the at least one pump,
   a recirculation duct branched off the downstream line, configured to collect a certain quantity of fluid in the downstream line and channel the fluid collected from the downstream line towards the upstream line,
   a means for regulating flow rate disposed on the recirculation duct,
   a phase measurer configured to determine a gas content value of a two-phase flow disposed in the upstream line, the recirculation duct being connected to the upstream line downstream of the phase measurer,
   a computing unit connected to the phase measurer and to the flow rate regulating means, said computing unit being configured to control the flow rate regulating means such as to control a degree of opening of said flow rate regulating means, according to the gas content value in the upstream line determined by the phase measurer.

2. The device according to claim 1, wherein the flow rate regulating means comprises a first regulating member connected to the computing unit, and a second regulating member disposed on the recirculation duct, a degree of opening of the second regulating member being controlled by the first regulating member.

3. The device according to claim 2, wherein, when the gas content value in the upstream line increases, the computing unit is configured to control at least partial closing of the second regulating member, by means of the first regulating member, such as to reduce the circulation flow rate of fluid flowing in the recirculation duct.

4. The device according to claim 2, wherein the first regulating member is a servo valve, and the second regulating member is a recirculation valve.

5. The device according to claim 1, wherein the at least one pump is a centrifugal pump with an impeller with blading.

6. A turbine engine comprising at least one device according to claim 1.

7. A method for regulating the fuel supply flow rate for a turbine engine using the device according to claim 1, comprising the steps of:
   determining, in the upstream line, the gas content value of a flow supplying the pump by means of the phase measurer;
   regulating the degree of opening of the flow rate regulating means by means of the computing unit according to the gas content value in the upstream line, determined at the determining step.

8. The method according to claim 7, wherein, when the phase measurer detects an increase in the gas content value at the determining step, the computing unit controls an at least partial closing of the flow regulating means such as to reduce a circulation output of the fluid flowing in the recirculation duct.

* * * * *